US008131416B2

(12) United States Patent
Thompson

(10) Patent No.: US 8,131,416 B2
(45) Date of Patent: Mar. 6, 2012

(54) GLOW PLUG CONTROL DUAL MODE FAULT DIAGNOSTICS

(75) Inventor: Brett B Thompson, Farmington Hills, MI (US)

(73) Assignee: GM Global Technology Operations LLC

( * ) Notice: Subject to any disclaimer, the term of this patent is extended or adjusted under 35 U.S.C. 154(b) by 869 days.

(21) Appl. No.: 12/188,530

(22) Filed: Aug. 8, 2008

(65) Prior Publication Data

US 2009/0323250 A1 Dec. 31, 2009

Related U.S. Application Data

(60) Provisional application No. 61/076,256, filed on Jun. 27, 2008.

(51) Int. Cl.
*G06F 7/00* (2006.01)

(52) U.S. Cl. .......................................................... 701/29

(58) Field of Classification Search .............. 701/29–31, 701/34; 702/182–185; 361/247, 253; 123/179.5, 123/179.6
See application file for complete search history.

(56) References Cited

U.S. PATENT DOCUMENTS 6,230,683 B1 * 5/2001 zur Loye et al. .............. 123/435
7,127,337 B2 * 10/2006 Bennett et al. .................. 701/22

* cited by examiner

*Primary Examiner* — Yonel Beaulieu

(57) ABSTRACT

A glow plug control system for a vehicle comprises a mode control module and a fault diagnostic module. The mode control module enables one of a first mode and a second mode of operation based on a period of time that a glow plug is ON during a drive cycle. The fault diagnostic module selectively diagnoses a fault based on a first message, a second message, and a third message when the first mode is enabled and selectively diagnoses the fault independent of the second and third messages when the second mode is enabled.

16 Claims, 4 Drawing Sheets

GLOW PLUG CONTROL DUAL MODE FAULT DIAGNOSTICS

CROSS-REFERENCE TO RELATED APPLICATIONS

This application claims the benefit of U.S. Provisional Application No. 61/076,256, filed on Jun. 27, 2008. The disclosure of the above application is incorporated herein by reference.

FIELD

The present disclosure relates to internal combustion engine systems and more particularly to glow plug control systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of an engine system 100 is presented. The engine system 100 includes an engine 102 that combusts an air/fuel mixture to generate torque. Air is drawn into the engine 102 through an intake manifold 104. A throttle valve 106 is controlled by an electric throttle controller (ETC) 108 and controls the amount of air drawn into the engine 102.

A fuel injector 110 injects fuel that mixes with air to form the air/fuel mixture. The air/fuel mixture is compressed and combusted within one or more cylinders of the engine 102, such as cylinder 112. Exhaust gas resulting from combustion is expelled from the engine 102 to an exhaust system 116. An engine control module (ECM) 130 controls torque output by the engine 102. For example, the ECM 130 controls torque output by the engine 102 based on driver inputs, such as accelerator and brake pedal positions. A driver input module 132 receives the driver inputs and transmits the driver inputs to the ECM 130.

The engine system 100 includes one or more glow plugs, such as glow plug 118. For example, one glow plug may be provided for each cylinder of the engine 102. The glow plug 118 generates heat and warms portions of the engine 102 when the glow plug 118 is activated. For example, the glow plug 118 may be used to warm an inner surface of the cylinder 112.

A glow plug control module 150 controls activation and deactivation of the glow plug 118 based on a driver input and/or various operating conditions. The driver input may include manipulation of a device and/or an ignition key within the vehicle. The operating conditions include engine coolant temperature, oil temperature, intake air temperature, and/or any other suitable operating condition. For example only, the glow plug control module 150 activates the glow plug 118 when the driver actuates the ignition key to a predetermined location and a temperature is less than a predetermined temperature.

SUMMARY

A glow plug control system for a vehicle comprises a mode control module and a fault diagnostic module. The mode control module enables one of a first mode and a second mode of operation based on a period of time that a glow plug is ON during a drive cycle. The fault diagnostic module selectively diagnoses a fault based on a first message, a second message, and a third message when the first mode is enabled and selectively diagnoses the fault independent of the second and third messages when the second mode is enabled.

In other features, the mode control module enables the second mode of operation when the glow plug is ON for a threshold period of time during the drive cycle.

In still other features, the first message includes engine speed data.

In further features, the second message includes mass airflow (MAF) data.

In still further features, the third message includes intake air temperature data.

In other features, the fault diagnostic module diagnoses the fault when at least one of the first, second, and third messages is absent for a first predetermined period of time while the first mode is enabled.

In further features, the fault diagnostic module diagnoses the fault when the first message is absent for a second predetermined period of time while the second mode is enabled.

In still further features, the second predetermined period is greater than the first predetermined period.

A method comprises enabling one of a first mode and a second mode of operation based on a period of time that a glow plug is ON during a drive cycle, selectively diagnosing a fault based on a first message, a second message, and a third message when the first mode is enabled, and selectively diagnosing the fault independent of the second and third messages when the second mode is enabled.

In other features, the enabling one of the first mode and the second mode comprises enabling the second mode of operation when the glow plug is ON for a threshold period of time during the drive cycle.

In still other features, the first message includes engine speed data.

In further features, the second message includes mass airflow (MAF) data.

In still further features, the third message includes intake air temperature data.

In other features, the selectively diagnosing the fault based on a first message, a second message, and a third message comprises diagnosing the fault when at least one of the first, second, and third messages is absent for a first predetermined period of time while the first mode is enabled.

In further features, the selectively diagnosing the fault independent of the second and third messages comprises diagnosing the fault when the first message is absent for a second predetermined period of time while the second mode is enabled.

In still further features, the second predetermined period is greater than the first predetermined period.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
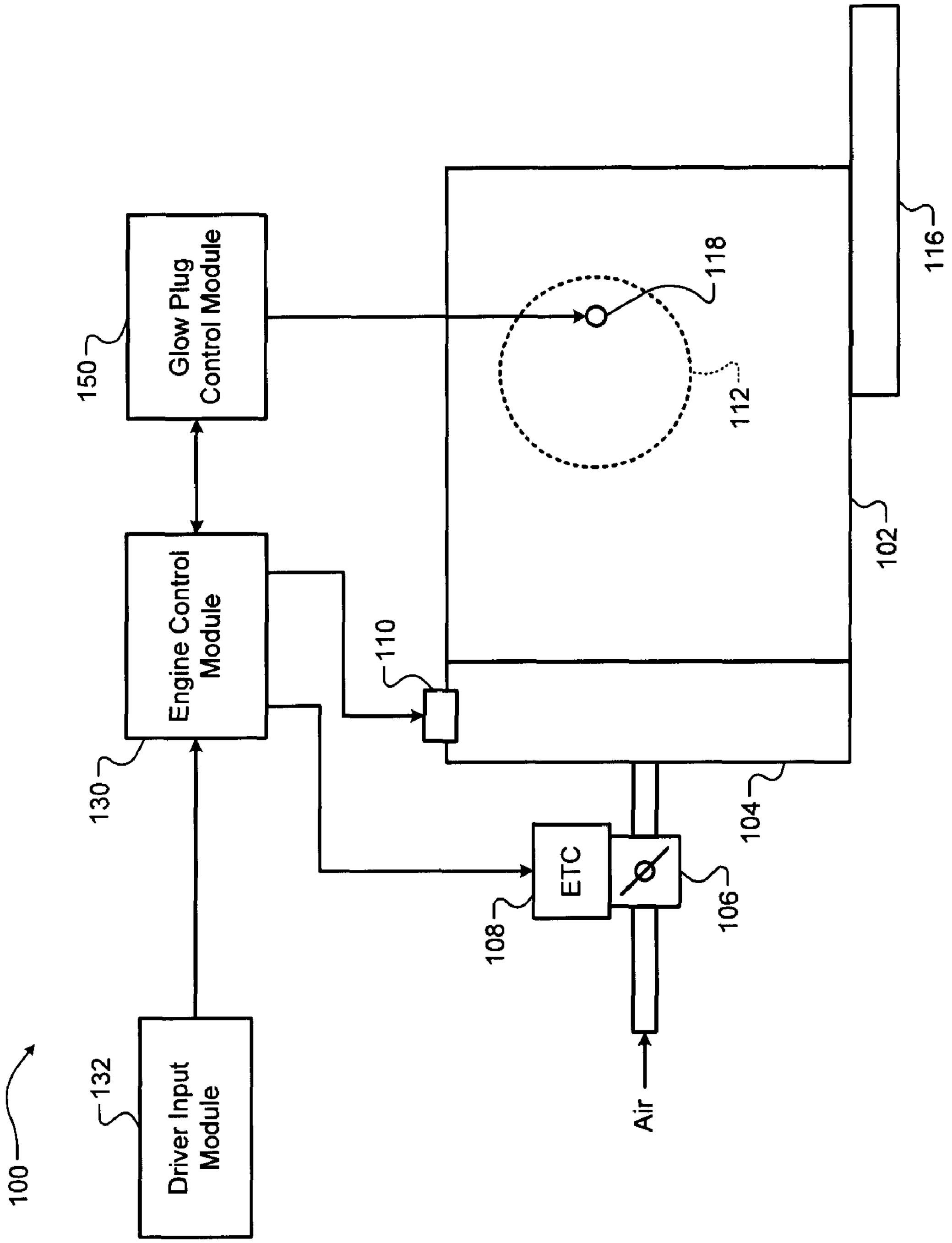
FIG. 1 Prior Art
FIG. 1 is a functional block diagram of an engine system according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An engine controller selectively transmits a plurality of messages to a glow plug controller. The glow plug controller diagnoses communication faults based on whether each of the messages is received within a predetermined period of time. The glow plug controller according to the principles of the present application monitors the amount of time that the glow plug has been active (i.e., ON) during a current drive cycle. The glow plug controller limits the diagnostic to diagnosing the communication fault based on one of the messages when the glow plug is active for a threshold period of time. In other words, the glow plug controller selectively diagnoses the communication fault based on the one of the messages when the glow plug has been active for the threshold period of time.

Figure 2:
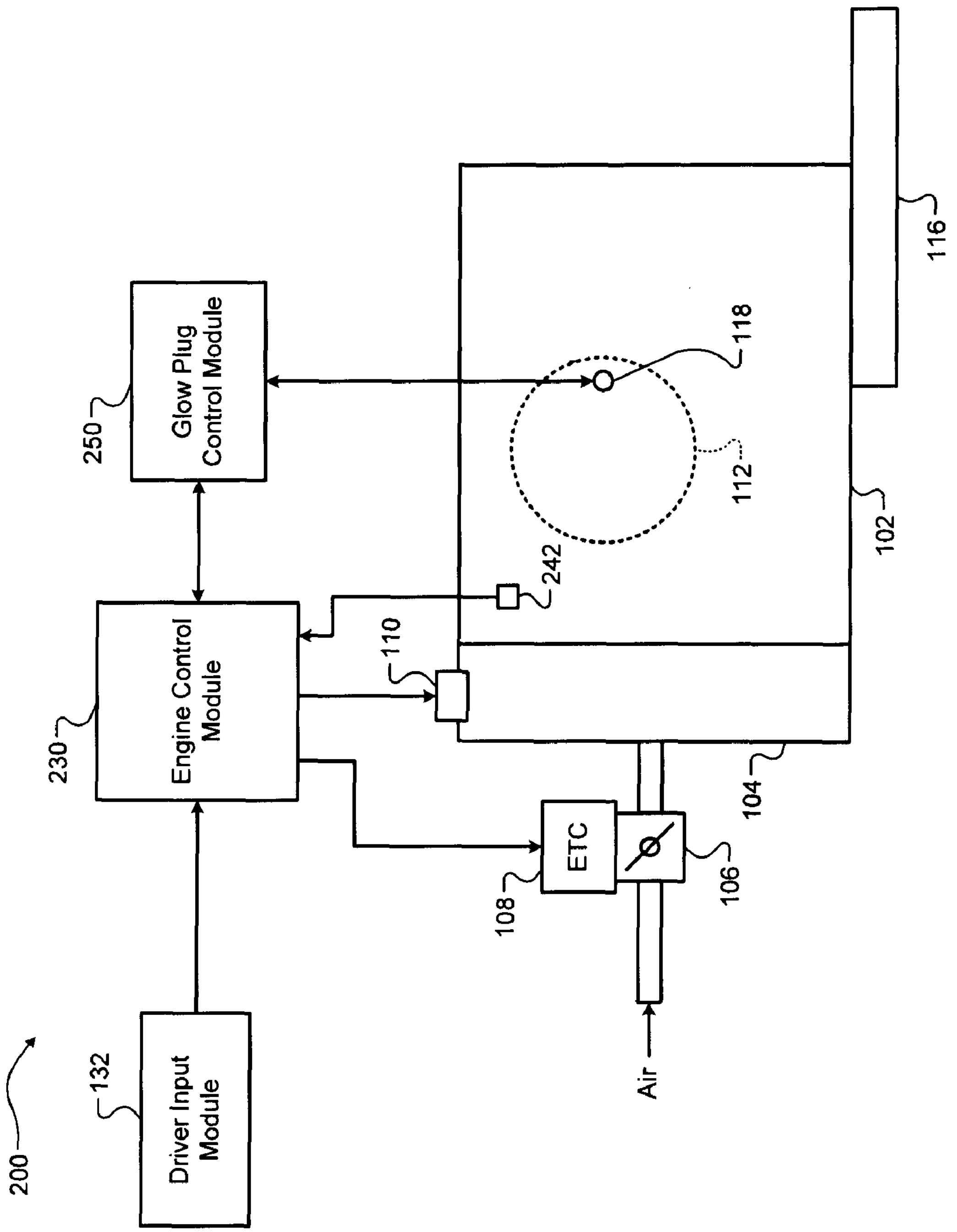
FIG. 2 is a functional block diagram of an exemplary engine system according to the principles of the present disclosure.

Referring now to FIG. 2, a functional block diagram of an exemplary engine system 200 is presented. The engine system 200 includes the engine 102 that combusts an air/fuel mixture to produce drive torque. The engine 102 may be any suitable type of engine, such as a diesel-type engine. Air is drawn into the intake manifold 104 through the throttle valve 106. The electronic throttle controller (ETC) 108 regulates opening of the throttle valve 106 to control the amount of air drawn into the intake manifold 104.

Air from the intake manifold 104 is drawn into cylinders of the engine 102. While the engine 102 may include multiple cylinders, for illustration purposes only, only the single representative cylinder 112 is shown. For example only, the engine 102 may include 2, 3, 4, 5, 6, 8, 10, and/or 12 cylinders. The fuel injector 110 injects fuel that mixes with the air and creates the air/fuel mixture. In various implementations, the fuel injector 110 injects fuel into the intake manifold 104 at a central location or at multiple locations, such as near an intake valve (not shown) associated with the cylinder 112. In other implementations, the fuel injector 110 injects fuel directly into the cylinder 112.

Combustion of the air/fuel mixture drives a piston (not shown) and generates torque. Byproducts of the combustion of the air/fuel mixture are expelled from the engine 102 to the exhaust system 116. While not shown, the engine system 200 may also include one or more electric motors or motor generator units that generate torque and/or generate electrical power for the vehicle.

An engine control module (ECM) 230 regulates torque output of the engine 102 based on various inputs. The inputs include, for example, a plurality of operating conditions and/or driver torque requests. The driver input module 132 receives the driver torque requests, such as an accelerator pedal position and/or a brake pedal position, and transmits the driver torque requests to the ECM 230. The operating conditions include, for example, mass airflow (MAF), manifold absolute pressure (MAP), intake air temperature (IAT), coolant temperature, oil temperature, and/or any other suitable operating condition.

An engine speed (EOS) sensor 242 measures the output speed of the engine 102 and generates an EOS signal accordingly. For example only, the EOS sensor 242 generates the EOS signal based on rotation of a crankshaft (not shown). More specifically, the EOS signal may be generated based on rotation of an N-toothed wheel (not shown) that is attached to the crankshaft.

The engine system 200 includes the glow plug 118 that generates heat when activated. The heat generated by the glow plug 118 warms various portions of the engine 102, such as the cylinder 112. While only the single representative glow plug 118 is shown, the engine system 200 may include one or more additional glow plugs. For example, one or more glow plugs may be provided for each cylinder of the engine 102.

Low temperature of the cylinder 112, and specifically low temperature of the inner surface of the cylinder 112, may affect combustion of the air/fuel mixture. For example, the low temperature may prevent the temperature of the compressed air or air/fuel mixture from increasing to an expected temperature. The low temperature may also prevent injected fuel from vaporizing as expected.

The driver input module 132 receives driver inputs relating to activation of the glow plug 118. These driver inputs may be based on, for example, a driver's manipulation of an ignition key and/or a device, such as a button or switch. A glow plug control module 250 and the ECM 230 communicate and share data. For example, the ECM 230 and the glow plug control module 250 may be connected via a bus. While the glow plug control module 250 is shown as being external to the ECM 230, the glow plug control module 250 may be implemented within the ECM 230 or within any other module of the vehicle.

The glow plug control module 250 selectively generates glow plug commands to activate and deactivate the glow plug 118. For example only, the glow plug control module 250 activates the glow plug 118 when the driver actuates the ignition key to a predetermined location and the engine temperature is less than a predetermined temperature. The coolant temperature, the oil temperature, and/or any other suitable temperature may be used as an indicator of the engine temperature. The glow plug control module 250 may later deactivate the glow plug 118 when the engine temperature increases to another predetermined temperature, after a period of time passes, and/or when other conditions are satisfied.

The glow plug control module 250 receives a plurality of messages from the ECM 230. For example only, the glow plug control module 250 receives three messages from the ECM 230: a first message, a second message, and a third message. Each message includes data that the glow plug control module 250 uses in controlling the glow plug 118. For example, the first message includes data regarding the EOS. The second message includes data regarding the MAF. The second message may also include data regarding fuel consumption. The third message includes data regarding the IAT.

The glow plug control module 250 receives each message at a predetermined location. For example, the glow plug control module 250 receives the first, second, and third messages at first, second, an third predetermined locations, respectively. A priority or a rank is assigned to each of the messages based on the relative importance of the data of the message as it relates to control of the glow plug 118. For example only, the first message is assigned the highest priority, the second message is assigned the second highest priority, and the third message is assigned the lowest priority. In other words, the message including EOS data may be assigned the highest priority, and the messages including the MAF and the IAT data may be assigned lower priorities.

The glow plug control module 250 selectively diagnoses a communication fault based on receipt of the messages. For example, the glow plug control module 250 monitors the messages and may diagnose a communication fault when one or more of the messages are not received within an expected period of time. When a communication fault is diagnosed, the glow plug control module 250 deactivates the glow plug 118 and may prevent re-activation of the glow plug 118. The glow plug control module 250 may also illuminate a "check engine" light and/or set a fault code in a predetermined location in memory (not shown) when a communication fault is diagnosed.

In some circumstances, however, diagnosing communication faults based on receipt of all of the messages within the expected period may cause the glow plug control module 250 to incorrectly diagnose an occurrence of a communication fault. For example, the ECM 230 may omit transmission of one or more of the lower priority messages under some circumstances, such as when the ECM 230 is transmitting higher priority messages to other modules and/or systems. Such an omission, while being intentional on the part of the ECM 230 to coordinate other control measures, may cause the glow plug control module 250 to incorrectly diagnose occurrence of a communication fault if transmission is omitted for longer than the expected period of time.

The glow plug control module 250 according to the principles of the present disclosure determines a period of time during which the glow plug 118 has been active (i.e., ON) during each drive cycle. One drive cycle begins when the glow plug 118 is activated at the start of the drive cycle and ends when the control systems of the vehicle are shut down. In some implementations, the control systems may remain active for a predetermined period of time after the engine 102 is shut down. In such implementations, the drive cycle continues if the engine 102 is re-started while the control systems are still active (i.e., before the control systems are shut down).

The glow plug control module 250 according to the principles of the present disclosure operates in one of a first mode and a second mode. In the first mode, the glow plug control module 250 selectively diagnoses a communication fault when any of the messages are not received during a first predetermined period of time. The glow plug control module 250 also selectively diagnoses the communication fault when one of the messages is not received for a second period of time when operating in the second mode. The glow plug control module 250 performs the communication fault diagnostic independent of the other messages when operating in the second mode.

The glow plug control module 250 selects the mode of operation based on the period of time that the glow plug 118 has been active during the current drive cycle. For example, the glow plug control module 250 enables the first mode of operation when the drive cycle begins and enables the second mode of operation when the glow plug 118 has been active for a threshold period of time. In this manner, the glow plug control module 250 diagnoses the communication fault based on the first message when the glow plug 118 has been active for the threshold period of time during the current drive cycle.

Figure 3:
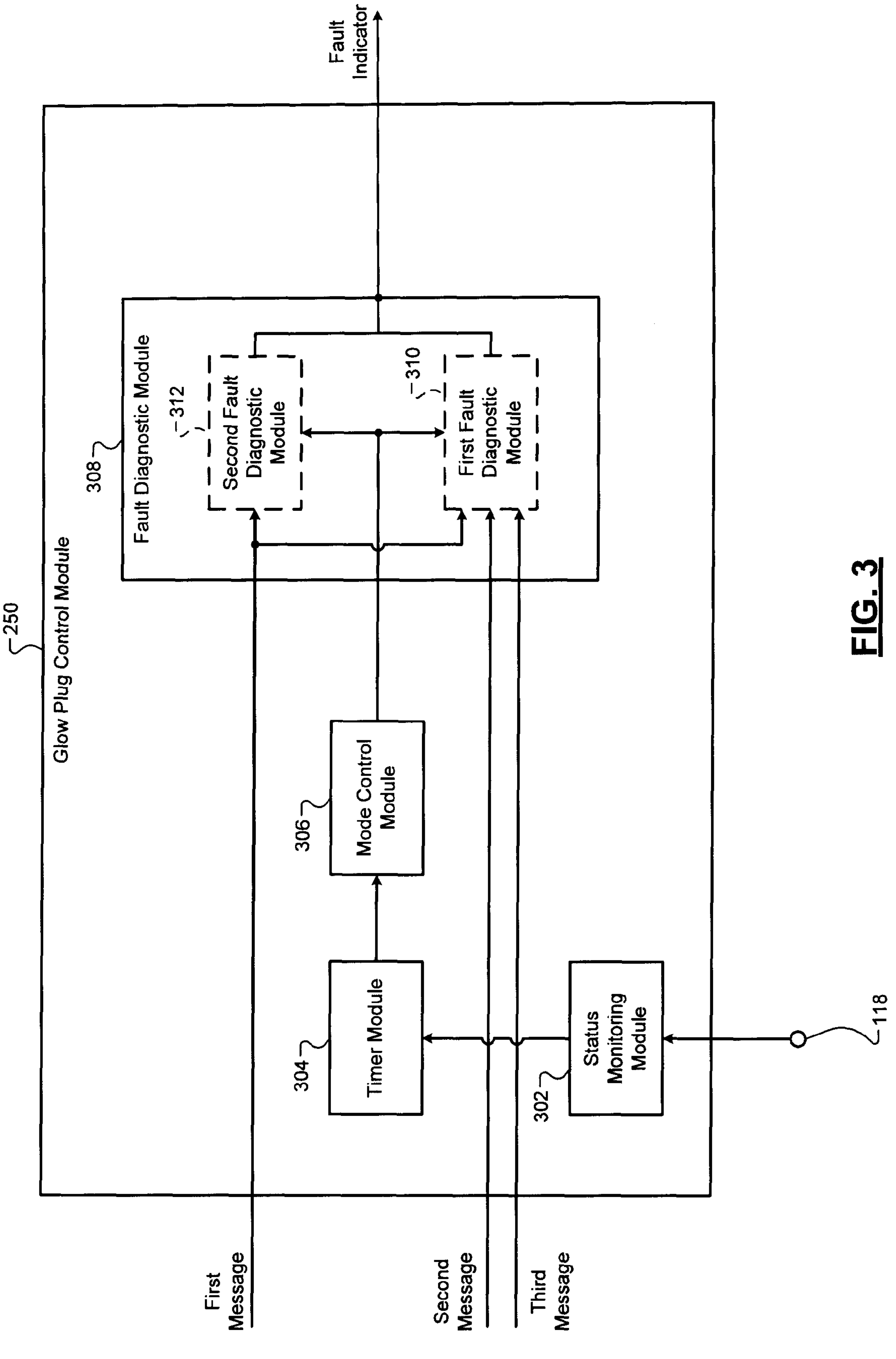
FIG. 3 is a functional block diagram of an exemplary glow plug control module according to the principles of the present disclosure.

Referring now to FIG. 3, a functional block diagram of an exemplary implementation of the glow plug control module 250 is presented. The glow plug control module 250 includes a status monitoring module 302, a timer module 304, a mode control module 306, and a fault diagnostic module 308. Each module may include one or more submodules. For example, the fault diagnostic module 308 may include a first fault diagnostic module 310 and a second fault diagnostic module 312. One or more of the modules shown can be combined and implemented within a single module.

The status monitoring module 302 determines whether the glow plug 118 is active and generates an activity status indicator (e.g., a signal) accordingly. The status monitoring module 302 may determine whether the glow plug 118 is active in any suitable manner, such as based on the glow plug command, the voltage of the glow plug 118, and/or the current through the glow plug 118.

The status monitoring module 302 controls the timer module 304 based on whether the glow plug 118 is active. More specifically, the status monitoring module 302 increments the timer module 304 when the glow plug 118 is active. The timer module 304 indicates how long the glow plug 118 has been active during the current drive cycle. In other words, the timer module 304 indicates the period of time that the glow plug 118 has been active during the current drive cycle. The timer module 304 is reset when each drive cycle is completed and/or before the glow plug 118 is activated at the beginning of each drive cycle. The timer module 304 may be reset to a predetermined reset value, such as 0.0 seconds.

The mode control module 306 selects one of the first and second modes of operation of the fault diagnostic module 308 based on the period of time that the glow plug 118 has been active during the current drive cycle. In other words, the mode control module 306 selects one of the first and second modes of operation based on the timer module 304. The mode control module 306 generates a mode command (e.g., a signal), which indicates the selected mode of operation of the fault diagnostic module 308.

In implementations where the fault diagnostic module 308 includes the first and second fault diagnostic modules 310 and 312, the mode control module 306 enables one of the first fault diagnostic module 310 and the second fault diagnostic module 312 based on the mode of operation. More specifically, the mode control module 306 enables the first and second fault diagnostic modules 310 and 312 to enable the first and second modes of operation, respectively. The mode control module 306 disables the other of the first and second fault diagnostic modules 310 and 312.

The mode control module 306 enables the first mode of operation and disables the second mode of operation of the fault diagnostic module 308 when the period of time is less than or equal to the threshold period of time. The mode control module 306 enables the second mode of operation and disables the first mode of operation of the fault diagnostic module 308 when the period of time is greater than the threshold period of time. The threshold period of time may be calibratable and may be set based on a period of time after which the glow plug control module 250 will not activate the glow plug 118. For example only, the threshold period may be set to approximately 3.0 minutes.

The fault diagnostic module 308 receives the first message, the second message, and the third message when the messages are transmitted by the ECM 230. While the three messages are shown, the fault diagnostic module 308 may receive any suitable number of messages from the ECM 230. The fault diagnostic module 308 selectively diagnoses a communication fault based on whether one or more of the messages are received within a predetermined period of time. In other words, the fault diagnostic module 308 selectively diagnoses a communication fault based on whether the ECM 230 transmits one or more of the messages within the predetermined period of time. A communication fault indicates that a loss of communication has occurred between the ECM 230 and the glow plug control module 250.

The selected mode of operation controls which message or messages the fault diagnostic module 308 will use in diagnosing whether a communication fault has occurred. The selected mode of operation may also control the predetermined period of time used in the diagnosis.

The first fault diagnostic module 310 selectively diagnoses a communication fault based on the first, second, and third messages. In other words, the fault diagnostic module 308 selectively diagnoses a communication fault based on whether each of the first, second, and third messages are received within a first predetermined period of time when the first mode of operation is enabled. More specifically, the fault diagnostic module 308 diagnoses a communication fault when one or more of the messages are not received within the first predetermined period of time.

The first predetermined period may be calibratable and may be set based on the frequency at which the ECM 230 is expected to transmit the messages. For example only, the first predetermined period may be set based on two-and-a-half times the frequency at which the ECM 230 is expected to transmit the message that is transmitted the least frequently (e.g., the second or third message), which may be approximately 10.0 seconds.

The fault diagnostic module 308 generates a fault indicator (e.g., a signal) when the communication fault is diagnosed. When a communication fault is diagnosed, the glow plug control module 250 may set a flag in memory and/or illuminate a light, such as a "check engine" light.

As stated above, when the amount of time that the glow plug 118 has been active during the current drive cycle is greater than the threshold period of time, the second mode of operation of the fault diagnostic module 308 is enabled. The fault diagnostic module 308 selectively diagnoses the communication fault independent of the second and third messages when the second mode of operation is enabled. In this manner, the fault diagnostic module 308 selectively diagnoses the communication fault based on the first message when the second mode of operation is enabled. More specifically, the fault diagnostic module 308 selectively diagnoses the communication fault based on whether the first message is received within a second predetermined period of time. If not, the fault diagnostic module 308 diagnoses occurrence of the communication fault.

The second predetermined period may be calibratable and may be set based on the frequency at which the ECM 230 is expected to transmit the first message. For example only, the second predetermined period may be set based on two-and-a-half times the frequency at which the ECM 230 is expected to transmit the first message, which may be approximately 12.0 seconds.

Figure 4:
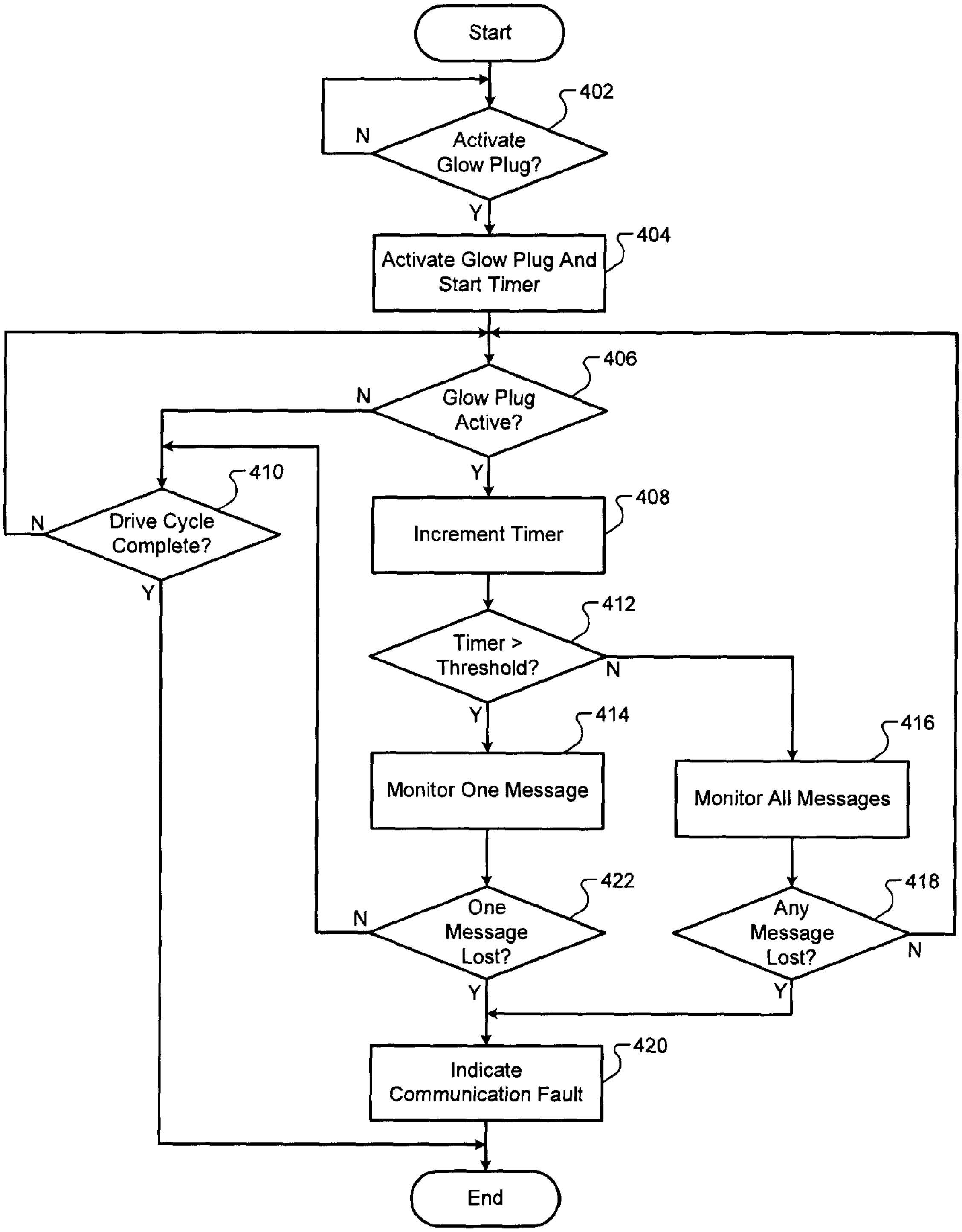
FIG. 4 is a flowchart depicting exemplary steps performed by the glow plug control module according to the principles of the present disclosure.

Referring now to FIG. 4, a flowchart depicting exemplary steps performed by the glow plug control module 250 is presented. Control begins in step 402 where control determines whether the glow plug 118 should be activated. If true, control proceeds to step 404. If false, control remains in step 402. Control may determine whether to activate the glow plug 118 based on any suitable parameter, such as a driver input, the coolant temperature, the oil temperature, and/or any other suitable parameter.

In step 404, control activates the glow plug 118 and starts the timer. Control may reset the timer before starting the timer. For example, control may reset the timer to a predetermined reset value, such as 0.0 seconds. Control proceeds to step 406 where control determines whether the glow plug 118 is active. If true, control proceeds to step 408. If false, control transfers to step 410.

Control determines whether the drive cycle is complete in step 410. If true, control ends. If false, control returns to step 406. One drive cycle begins when the glow plug 118 is activated at the start of the drive cycle and ends when the control systems of the vehicle are shut down.

Referring again to step 408 (i.e., when the glow plug 118 is active), control increments the timer in step 408. In this manner, the timer indicates how long the glow plug 118 has been active during the current drive cycle. Control then continues to step 412 where control determines whether the timer is greater than a threshold period of time. If true, control continues to step 414. If false, control transfers to step 416. The threshold period of time may be calibratable and may be set based on a period of time after which control will not activate the glow plug 118 during the current drive cycle. For example only, the threshold period may be set to approximately 3.0 minutes.

In step 416, control monitors all of the messages (e.g., the first, second, and third messages) transmitted by the ECM 230. Control determines whether any of the messages have been lost in step 418. In other words, control diagnoses whether a communication fault has occurred in step 418 based on whether any of messages have not been received during the first predetermined period of time. If true, control continues to step 420. If false, control returns to step 406. The first predetermined period may be calibratable and may be set to, for example, approximately 10.0 seconds.

Referring again to step 414 (i.e., where the timer is greater than the threshold period), control switches to monitoring one of the messages. In other words, control disables monitoring the second and third messages in step 414. In other words, control monitors the first message in step 414. For example, the one message may be the first message. Control continues to step 422 where control determines whether the one message is lost. In other words, control determines whether the communication fault has occurred based on the one message. If true, control continues to step 420. If false, control returns to step 410.

Control determines whether the communication fault has occurred based on whether the one message has been received within the second predetermined period of time. The second predetermined period may be calibratable and may be set to, for example, approximately 12.0 seconds. In step 420, control indicates that a communication fault has occurred and control ends. Control may also take other remedial measures such as illuminating the "check engine" light and/or set a fault code in a predetermined location in memory.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A glow plug control system for a vehicle, comprising:

a mode control module that enables one of a first mode and a second mode of operation based on a period of time that a glow plug is ON during a drive cycle; and a fault diagnostic module that selectively diagnoses a fault based on a first message, a second message, and a third message when said first mode is enabled and that selectively diagnoses said fault independent of said second and third messages when said second mode is enabled.

2. The glow plug control system of claim 1 wherein said mode control module enables said second mode of operation when said glow plug is ON for a threshold period of time during said drive cycle.

3. The glow plug control system of claim 1 wherein said first message includes engine speed data.

4. The glow plug control system of claim 1 wherein said second message includes mass airflow (MAF) data.

5. The glow plug control system of claim 1 wherein said third message includes intake air temperature data.

6. The glow plug control system of claim 1 wherein fault diagnostic module diagnoses said fault when at least one of said first, second, and third messages is absent for a first predetermined period of time while said first mode is enabled.

7. The glow plug control system of claim 6 wherein said fault diagnostic module diagnoses said fault when said first message is absent for a second predetermined period of time while said second mode is enabled.

8. The glow plug control system of claim 7 wherein said second predetermined period is greater than said first predetermined period.

9. A method comprising:

enabling one of a first mode and a second mode of operation based on a period of time that a glow plug is ON during a drive cycle;

selectively diagnosing a fault based on a first message, a second message, and a third message when said first mode is enabled; and selectively diagnosing said fault independent of said second and third messages when said second mode is enabled.

10. The method of claim 9 wherein said enabling one of said first mode and said second mode comprises enabling said second mode of operation when said glow plug is ON for a threshold period of time during said drive cycle.

11. The method of claim 9 wherein said first message includes engine speed data.

12. The method of claim 9 wherein said second message includes mass airflow (MAF) data.

13. The method of claim 9 wherein said third message includes intake air temperature data.

14. The method of claim 9 wherein said selectively diagnosing said fault based on a first message, a second message, and a third message comprises diagnosing said fault when at least one of said first, second, and third messages is absent for a first predetermined period of time while said first mode is enabled.

15. The method of claim 14 wherein said selectively diagnosing said fault independent of said second and third messages comprises diagnosing said fault when said first message is absent for a second predetermined period of time while said second mode is enabled.

16. The method of claim 15 wherein said second predetermined period is greater than said first predetermined period.

* * * * *